United States Patent
Siefert et al.

(10) Patent No.: US 6,526,512 B1
(45) Date of Patent: Feb. 25, 2003

(54) ACCESS KEY CODES FOR COMPUTER RESOURCES

(75) Inventors: David M. Siefert, Englewood, OH (US); Tab A. McCollum, Camden, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/650,492

(22) Filed: May 20, 1996

(51) Int. Cl.[7] .................................................. H04L 9/00
(52) U.S. Cl. ........................................ 713/200; 713/201
(58) Field of Search ........................... 395/186, 187.01, 395/188.01, 491, 472, 479, 490; 380/4, 3, 23, 25; 364/222.5, 286.4, 286.5, 260.81; 713/200, 201, 202

(56) References Cited

U.S. PATENT DOCUMENTS

| | | | | |
|---|---|---|---|---|
| 4,439,830 A | * | 3/1984 | Chuch .......................... 364/200 |
| 5,065,429 A | * | 11/1991 | Lang ............................. 380/25 |
| 5,191,611 A | * | 3/1993 | Lang ............................. 380/25 |
| 5,414,852 A | * | 5/1995 | Kramer et al. ............... 395/700 |
| 5,469,556 A | * | 11/1995 | Clifton ......................... 395/490 |
| 5,483,596 A | * | 1/1996 | Rosenow et al. ............. 380/25 |

* cited by examiner

*Primary Examiner*—Dieu-Minh Le
(74) *Attorney, Agent, or Firm*—Gregory A. Welte

(57) ABSTRACT

A security system for computer repositories. Users of the repositories are assigned key codes. The repositories contain resources, such as programs and data, which are also assigned key codes. The key code of a resource contains fields, which contain information, in encoded form, which specify characteristics of users which are necessary to gain access to the resource, and conditions under which access is to be allowed. For example, a given key code may specify that only users having (i) a surname beginning with "W", and (ii) a "classified" security clearance will be granted access and, further, (iii) that access will be granted only on odd-numbered Wednesdays. When a user seeks access to a resource, a security process inquires whether the user's key code indicates that the user meets the conditions specified by the resource's key code.

1 Claim, 6 Drawing Sheets

ACCESS KEY CODES FOR COMPUTER RESOURCES

The invention concerns codes which act as keys to unlock resources stored in computer systems, thereby allowing users to gain access to the resources.

BACKGROUND OF THE INVENTION

As digital storage technology advances, and its use becomes more widespread, an ever-growing base of information is becoming available to an increasing population of information consumers. However, maintaining and providing this information cannot be done free of charge, and, in many cases, the costs involved are imposed, at least in part, upon the information consumers.

For example, if a newspaper is made available through a computer on-line service, the costs of producing the newspaper must somehow be defrayed. One approach to defraying the cost is to assess a fee against consumers who access the newspaper. This assessment procedure inherently involves a restriction in access: access is allowed exclusively to those who pay the access fee.

In addition, and irrespective of cost considerations, access to certain types of information must be restricted for other reasons. For example, some information is confidential to its owner, and the owner will restrict access only to the owner's designees.

Methods of restricting access to information contained within databases and repositories and other systems are known. The present invention proposes security measures which, in certain situations, are believed to offer superior performance, in terms of offering high security at low cost, with maximal convenience offered to users, particularly where users execute automated searches of large repositories of information.

OBJECTS OF THE INVENTION

One object of the invention is to provide enhanced security in information stored in mass databases and repositories.

SUMMARY OF THE INVENTION

In one form of the invention, a user of a computer storage repository is assigned a key code, by a system administrator. Each resource within the repository, such as a computer program or block of data, is also assigned a key code. The key codes contain fields which describe characteristics of the respective resources and users. When the user seeks access to th e re source, a process inquires whether the user's key code matches the resource's key code. If the key codes match, the user is granted access to the resource.

DETAILED DESCRIPTION OF THE INVENTION

Figure 1:
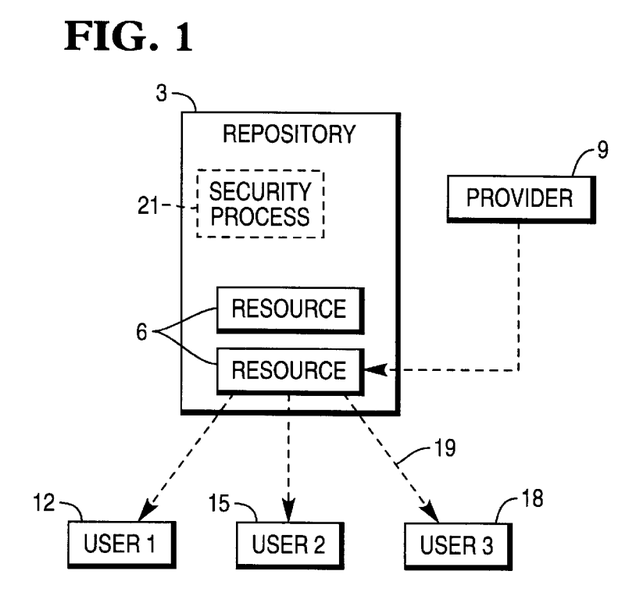
FIG. 1 illustrate s one form of the invention.

FIG. 1 illustrates a system wherein a repository 3 stores resources 6. The resources 6 can take the form of downloadable assets, such as computer programs, or blocks of data, or files of information. The repository 3 can take the form of a server, such as a microcomputer.

Of course, FIG. 1 is a simplification. In the general case, the repository 3 can take the form of multiple, interlinked computers, of significantly greater power than a single microcomputer. Further, in the general case, the resources will number in the millions, or more, and need not be contained within a single repository or system.

Resources are delivered to the repository by providers, such as provider 9, as known in the art. Users 12, 15, and 18 are able to gain access the resources 6, as indicated by the dashed lines 19, by remote communication links, such as modems communicating on common-carrier telephone channels.

Figure 2:
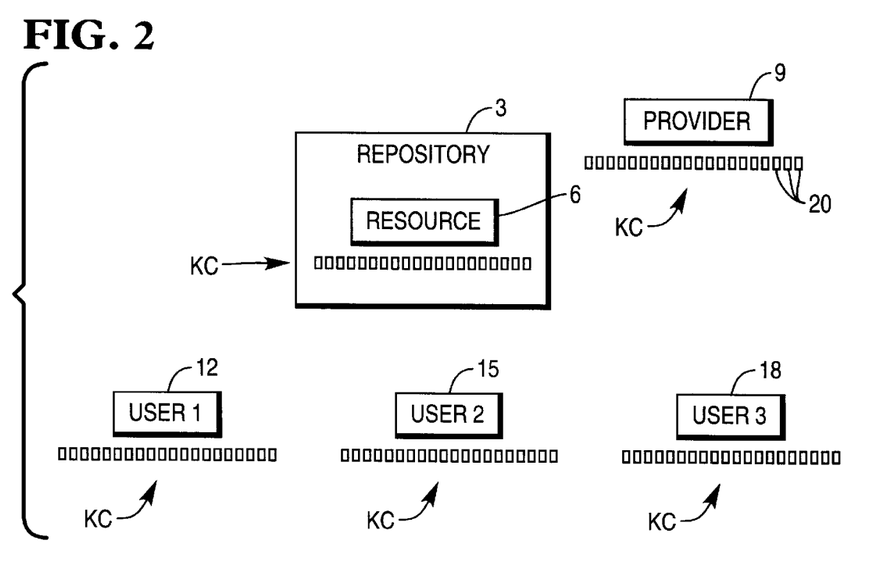
FIG. 2 illustrates key codes KC associated with providers, resources, and users.

To enhance security of the resources, the resources and the users are each assigned key codes KC in FIG. 2. The key codes are preferably binary numbers, 20 bytes in length, which is a length corresponding to 160 bits (20 bytes×8 bits/byte=160 bits). Each block 20 in the key codes, as indicated in the key code of provider 9, represents one byte.

For a user to gain access to a resource, the user's key code must match that of the resource in question. A computer security process 21, or program, in FIG. 1, running within the system, checks the key codes for the match. A simplified example will illustrate the checking process.

Figure 3:
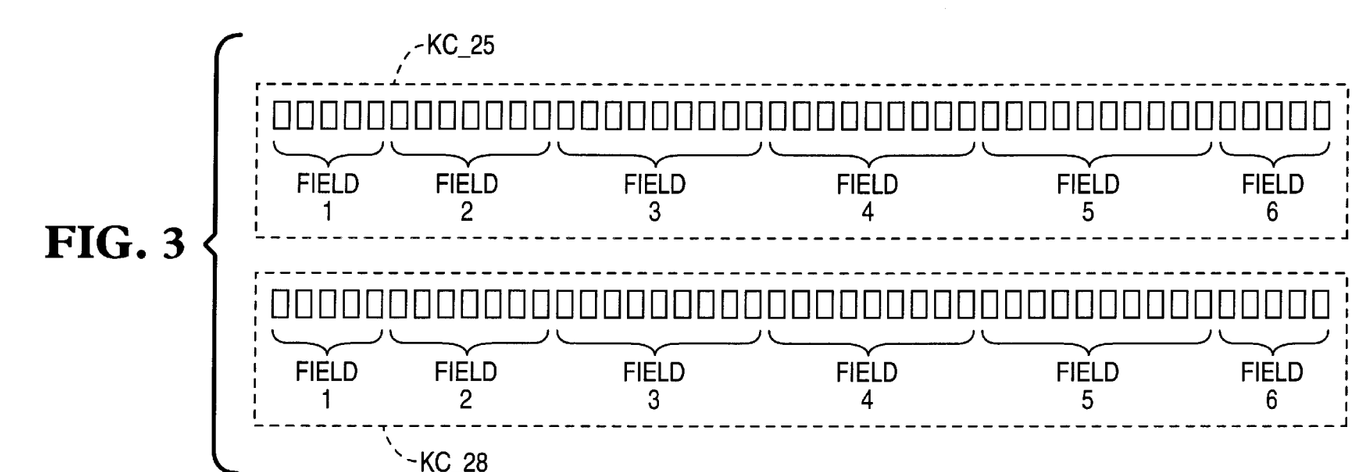
FIG. 3 illustrates division of key codes into fields, which contain sub-codes.

FIG. 3 illustrates the key code KC_25 of the user and key code KC_28 of the resource. The key codes are divided into fields, as indicated, and each field contains part of the key code, or a sub-code. The specific fields used will depend on the particular embodiment of the invention. Some illustrative fields are shown in the Figure, and are the following:

Security clearance level (eg, 00 means "classified," 01 means "secret," 10 means "top secret");

Type of read/Write privileges allowed (eg, 0 means read-only, 1 means read and write allowed);

Length of time access allowed. (Eg, decimal equivalent of binary number within a field indicates the number of ten-minute intervals of access allowed. For example, "11", corresponding to decimal "3", means that 30 minutes of access, or 3×10, are allowed);

Time window during which access allowed (eg, "00" means sunrise-to-sunset, "01" means odd-numbered days, "10" means January through March); and so on.

Figure 4:
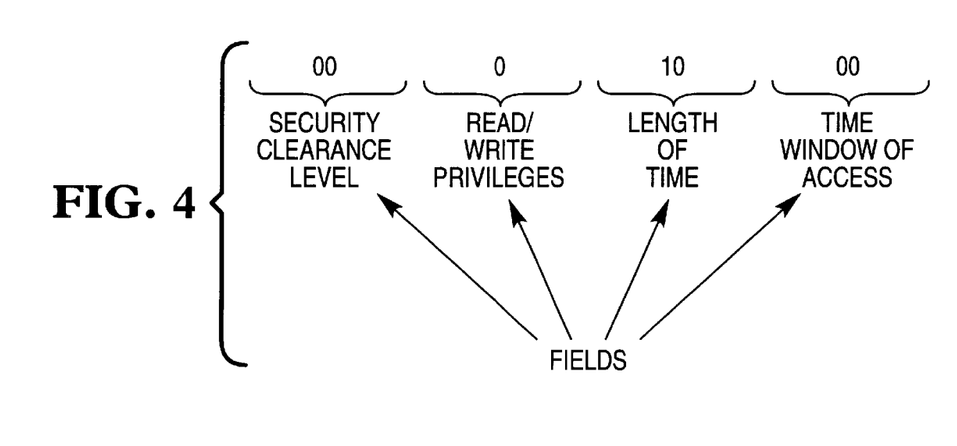
FIG. 4 illustrates hypothetical content of four fields of a key code.

FIG. 4 illustrates four fields of an exemplary key code, indicating that (1) a classified clearance is required, (2) read-only privileges are allowed, (3) 20 minutes of access is allowed per visit, and (4) access is allowed during the period of sunrise-to-sunset, consistent with the conventions described immediately above.

When the user seeks access to the resource, the security process 21 in FIG. 1 compares the key code KC_25 in FIG. 3 of the user with the key code KC_28 of the resource, as by performing an EX-OR operation. Table 1, below, illustrates the truth table for the EX-OR operation.

TABLE 1

| A | B | A EX-OR B |
|---|---|-----------|
| 0 | 0 | 1 |
| 0 | 1 | 0 |
| 1 | 0 | 0 |
| 1 | 1 | 1 |

As Table 1 indicates, the EX-OR function produces a "1" as output when the inputs (A and B) are identical. Conversely, the EX-OR function produces "0" as output when the inputs are different.

Consequently, when two key codes are EX-ORed with each other, and if they are identical, the output is a string of "1's", of same length as the key codes. For example, EX-ORing the short, illustrative key code 1010 with the same code 1010 produces 1111. In contrast, if the key codes are different, a ZERO appears at the position of the difference.

For example, EX-ORing the code 1010 with the different code 1110 produces 1011.

Thus, the EX-OR operation provides a convenient approach to determining whether two codes match. If the result of the EX-OR operation is a string of ONEs, a match is indicated, and the user is granted access to the resource. If the EX-ORing operation produces a single ZERO, access is denied.

Interim Summary

Therefore, in the embodiment described, the invention stores multiple resources, each of which is assigned a key code. All users wishing to gain access to the resources are also assigned key codes. The method of selecting the key codes was not discussed, but they can be assigned by a system administrator, in a straightforward manner. In addition, the assignment can be done at a single point in time or, more likely, will occur at multiple, different, times, as both users and resources enter and leave the system.

When a user wishes to obtain access to a resource, a computer process checks the key codes for a match, and grants, or denies, access, as appropriate.

User Identification Field

Figure 5:
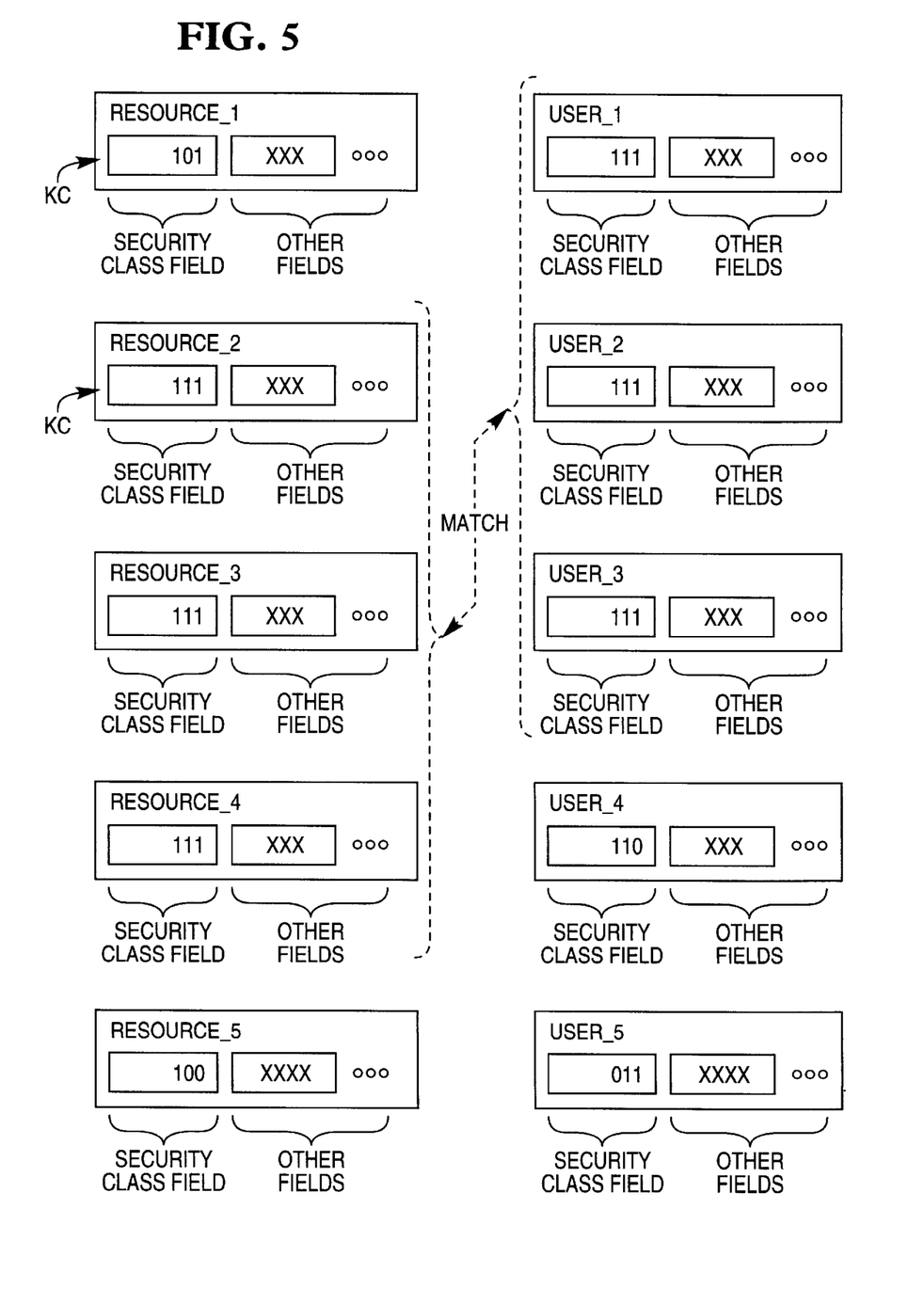
FIG. 5 illustrates a collection of resources, and users, some of which are assigned the same sub-code in a "security classification field."

The key code shown in FIG. 3 contains sub-codes within individual fields, as discussed above. Considering the key codes assigned to different users, many different users may be assigned identical sub-codes in a given field. FIG. 5 provides an example.

The "Security Classification" field for users 1 through 3, located on the right side of the Figure, contain identical sub-codes, namely, 111. In contrast, the same "Security Classification" fields for users 4 and 5 contain sub-codes which are both different from each other, and different from those of users 1 through 3. (The "X's" in the sub-codes in "other fields" indicate "don't care" conditions, and represent arbitrary characters.)

Similarly, in the resources, different resources may be assigned identical sub-codes in a given field. The "Security Classification" field for resources 2 through 4 may contain identical sub-codes, namely, 111. In contrast, the same "Security Classification" field for the remaining resources contain different sub-codes.

Consequently, the "Security Classification" field of users 1 through 3 will match the "Security Classification" of resources labeled 2 through 4, as indicated by the arrows labeled "MATCH." One use for this commonality in sub-codes is illustrated by the following example.

Example

In government security classifications, different classifications are more restrictive than others. For example, a "secret" clearance is more restrictive than a "classified" clearance. Because of the less restrictive nature of a "classified" clearance, a larger number of "classified" clearances will exist, compared to "secret" clearances. Consequently, it may be desirable to make a given resource available to all holders of a "classified" clearance. The approach illustrated in FIG. 5 allows this availability: users 1 through 3 are allowed access to resources 2 through 4 (provided, of course, that the remainders of the key codes match, or meet other criteria, as discussed below.).

It may be desirable to use a field to distinguish one, or more users, from a larger group, thereby, in effect, using that field as a user identification number. For example, assume 16 users, assigned numbers from 0000 to 1111. Assume one of the fields within the key code acts as an identification, or ID, field.

The user ID field contains the user's ID number, which may be 5 (decimal). However, the resource's ID field contains two numbers, which specify a range of user ID numbers to be granted access to the resource. For example, one number may be 1 (decimal), and the second number may be 10 (decimal). The range specified is thus from user ID 1 to user ID 10, inclusive.

When a user seeks to gain access to the resource, the security process 21 in FIG. 1 compares the user ID field with the range of allowed ID numbers, contained in the resource's ID field. If the user's ID number falls within the range, then access is granted (provided the remainder of the key codes match). If the user's ID number does not fall within the range, access is denied.

It is possible, by using very long key codes, to store a list of all ID numbers of users who are allowed access, rather than a range of ID numbers.

Weighting of Fields

An exact match between a user's entire key code and a resource's entire key code may not be necessary. For example, it may be determined that a length-of-access-time limitation only applies to certain users, such as those having lower-ranked security clearances, such as "classified." Conversely, it may be determined that no limitation is necessary for higher-ranked clearances, such as "secret."

Therefore, as an example, the security process can undertake the following logic:

1. If the security field of the user indicates a relatively low type of clearance (eg, "classified"), then another field, the length-of-access-time field, is examined.
2. If the security field of the user indicates another, higher, type of clearance (eg, "secret"), then the length-of-access-time field is taken as irrelevant, and restrictions as to dates on which access are allowed may be taken as irrelevant also.

Restated, when a "secret" security field is present, the duration-of-access and date-of-access fields may become "don't care" conditions.

The preceding example illustrates a case wherein a selected field was allowed to outweigh another field: the security field can outweigh the length-of-access-time field.

In a more general case, fields can be assigned weights, which each are multiplied by a factor, and the products then summed. The "factor" is the number ZERO or ONE. The factor for a given field is assigned a value of ZERO if no match occurs, and a value of ONE if a match is found.

For example, assume three fields, A, B, and C. Assume that the weights are 5, 10, and 15, respectively. Assume that fields A and C match, but that fields B do not. In this case, the factors for fields A and C are ONE, and that for field B is ZERO. The sum is the following:

(5×1)+(10×0)+(15×1)=20

The sum is compared with a predetermined number, and if the sum exceeds that number, access is granted. Otherwise, access is denied.

The weighting approach allows a match in one, or more, fields to compensate for deficiencies in other fields. For example, assume a "super-administrator" field having a weight of 200. Assume that ten other fields exist, each having a weight no greater than 20. Thus, even if all ten fields match, the total sum cannot exceed 200 (ie, 10×20). If the threshold is 190, then a user having a matching super-administrator field will be granted access, no matter how the remaining ten fields match.

In another approach, the factors need not be limited to the values ONE and ZERO, but may be assigned real numbers. For example, the factors may assume the values of the binary numbers contained within the respective fields.

"Distance" Between User's Field and Resource's Field

As a specific type of weighting, it may be desirable to implement the concept of "distance" between a user's sub-codes, and the resource's sub-codes. For example, considering the security classification field, a ranking can be made among the possible contents of the field. "Top secret" can be ranked first, with a value of 15, "Secret" ranked second, with a value of 10, and "Classified" can be ranked third, with a value of 5.

If a "Classified" user, having a value of 5, seeks access to a "Top Secret" resource, having a value of 15, the "distance" between the user's ranking and the resource's ranking is negative 10 (ie, 5–15). However, this negative distance can be compensated by a positive distance in another field.

For example, in a military analogy, a "military rank" field may exist, wherein access to the resource in question is limited to those of rank of lieutenant (value 10) and above. A major general (value 30) will have a distance of positive 20 (ie, 30–10) in this field. This positive distance of 20 can be used to compensate the negative distance of 10 in the "security" field, to allow access.

Other Pairings Beside User/Resource

Assume that the provider of FIG. 2 provides access to resources, such as by providing on-line services. For example, on-line services are available which contain legal research materials, such as that provided by West Publishing Company, Minneapolis, Minn., under the name WESTLAW™. In this example, a given court decision, such as Marbury v. Madison, represents a resource, and is assigned a key code. The provider is also assigned a key code, as is the user.

When the user attempts to gain access to the court decision, the user must first gain access to the provider (ie, the on-line-service), by matching the user's key code with that of the provider. Then, if a successful match is made, the user must match the resource's key code.

The two matchings need not be identical. For example, selected fields may be used in determining the user-provider match, and other fields may be used in addition, or instead, in determining the user-resource match.

Second Interim Summary

In the embodiments described above, both users and resources are assigned key codes, which are divided into fields, which contain sub-codes. Comparison, by a computer security process, of a user's key code with that of a resource will determine whether the user is granted access to the resource.

Several modes of comparison are possible. One mode is to look for an exact match, as by EX-ORing the two key codes. Another is to look for a match in specific fields. If the specific fields match, then access is granted, irrespective of matches in other fields. If the fields fail to match, then another comparison is undertaken, as by seeking a match between other selected fields. This procedure of (1) match-failure in one field, followed by (2) additional match-seeking in other fields, can be repeated a predetermined number of times.

A third mode is to assign weights to the fields. A fourth mode is to base each comparison of pairs of sub-codes on the concept of "distance." The distance is the numerical difference between the sub-codes. Of course, if sub-codes in corresponding fields match, then the distance is zero.

More than one match may be required. For example, a user may be required to match not only the key code of a resource, but also that of the provider of the resource.

Application to Discrete Computer

Illegal copying of software represents a problem to owners of software copyrights. One form of the invention can be used to deter such copying.

Figure 6:
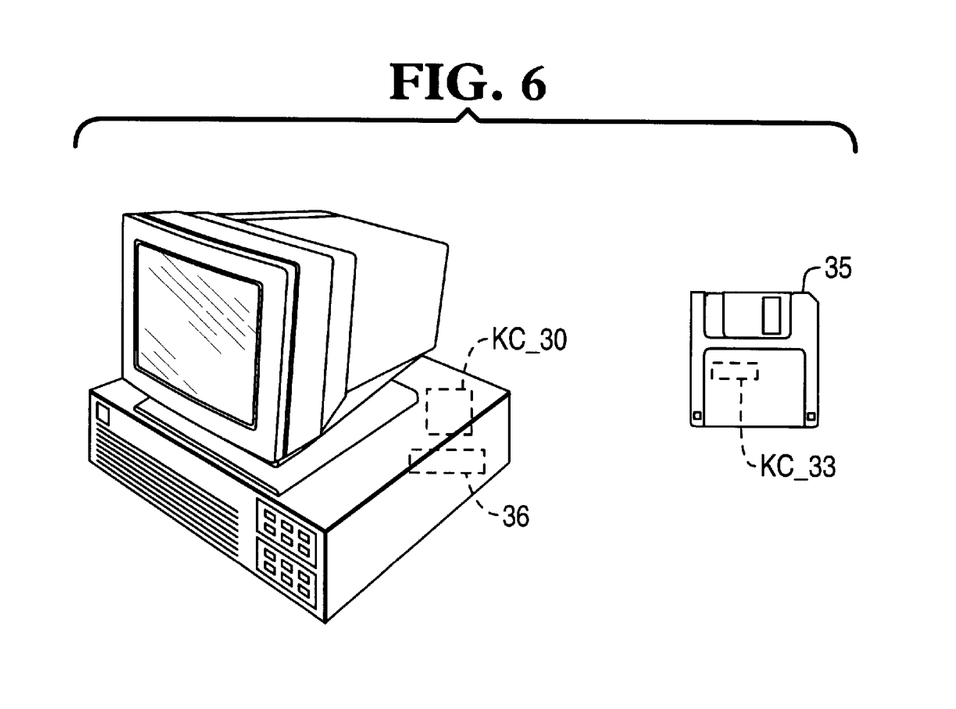
FIG. 6 illustrates key codes associated with a computer, and with software to be run on the computer.

A computer 36 in FIG. 6 is equipped with a key code KC_30. The key code can be burned into Read Only Memory (ROM) which is a part of the hardware of the computer, by the manufacturer of the computer. Alternately, the key code can be buried within the operating system software, in a manner making it difficult to locate. In the latter case, a key code will be assigned to each copy of the operating system software which is delivered, by the manufacturer of the operating system.

In either case, the key code is associated with the computer, is readable by the microprocessor (not shown in FIG. 6) contained within the computer, and is stored in a manner designed to impose significant difficulty upon a hacker seeking to learn, or modify, the key code.

The software in question, contained on a storage device, such as floppy diskette 35, whose illegal copying is to be thwarted, is also equipped with a key code KC_33, buried at a known location, or within a header associated with the software.

In explaining the embodiment of the invention under discussion, it is first necessary to present a brief background explaining how computers launch a program.

Background re: Launching of Program

In many types of computer, the operating system handles launching of programs. One such operating system is that available from Microsoft Corporation, Redmond, Wash., under the trade name DOS, which is an acronym for "Disc Operating System." When a user calls for a program to be run, as by entering, at the command line, the file name of the program, such as "PROGRAM.EXE," the operating system responds by taking a series of actions.

Figure 7A:
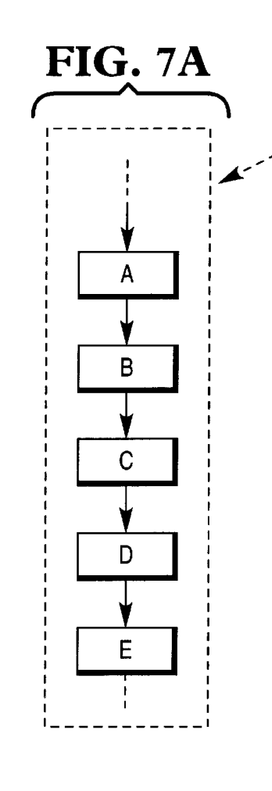
FIG. 7A illustrates, generically, a sequence of steps undertaken by an operating system in launching a computer program.

These actions include loading the program into system memory, setting a series of pointers and other objects within memory, and then setting the program counter of the microprocessor to the memory address where the beginning of the program resides. The processor then loads the instruction stored at that address, and begins running the program, which is "PROGRAM.EXE" in this example. These actions are generically indicated by the steps A through E in FIG. 7A.

Figure 7B:
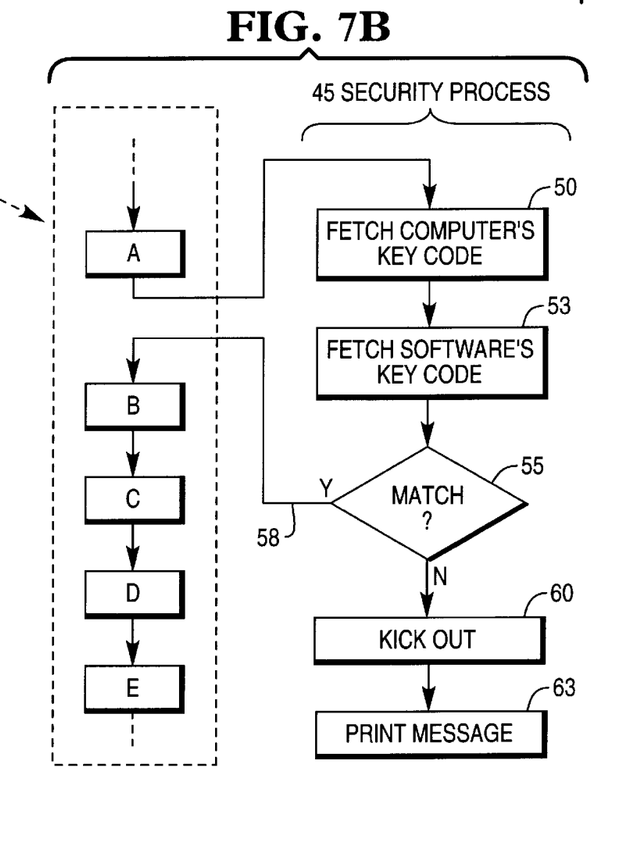
FIG. 7B illustrates splicing of a security process 45 into the sequence of FIG. 7A.

Under one embodiment of the invention, a security process 45, also called a match-determination process, is spliced into this launching sequence, as indicated in FIG. 7B. This additional process is a match-determination process, which fetches the key codes of both the computer and the program, as indicated by blocks 50 and 53. Then, the match-determination process determines whether the key codes match, as indicated by block 55. If so, the match-determination process returns control to the launch sequence, as indicated by arrow 58, and the launch occurs in the normal fashion.

If no match occurs, then the match-determination process "kicks out" of the launching sequence, as indicated by block 60, thereby preventing the launch sequence from completing. "Kicking out" refers to blocking completion of the usual launch sequence. Then, as an option, the match-determination process can print a message on the user's computer display, indicated by block 63, such as "Valid Key Codes Not Found," in order to assure the user that the failure to launch is not due to a hardware malfunction of the computer.

In addition, if the key codes do not match, the match-determination process can take other actions, such as erasing part, or all, of the program residing in system memory, or by setting the program counter to a false address, both of which will defeat running of the program.

Presently available software does not contain key codes. In order to allow the computer 36 in FIG. 4 to run such software, several approaches are possible. One is that, upon an order to launch a program, the invention examines the header of the program to be launched, in order to determine the release number, version number, edition number, or equivalent. The invention is equipped with a table for various programs, indicating versions, editions, etc., prior to which no key code is required.

If the program to be launched is of a version, edition, etc., requiring no key code, then the program is launched as usual. If the program is of a later version, edition, etc., and does require a key code, then the program is required to pass the security process 45, as described above.

It should be observed that the match-determination process just described can be defeated, but not without effort. For example, a hacker can remove the security process 45, shown in FIG. 7B, from the operating system launch process, thereby allowing the original sequence of FIG. 7A to run, and launch the copied program. However, doing so will require a significant effort by the hacker, because doing so, in effect, involves re-writing part of the operating system.

Further, removal of the match-determination process 45 can be made difficult, by hiding it. For example, one approach to hiding code involves splitting the code into separate modules, placing them in separate memory locations, and, during operation, jumping from module-to-module, using branch and jump commands. This approach makes it difficult to trace the logic of the code and locate the modules.

In addition, it is possible that a hacker can defeat the match-determination process just described, by running a commercially available program of the class called "de-buggers." Such programs can run the security process 45, one instruction at-a-time. Thus, with a de-bugger, the hacker can accomplish at least two goals. One, the hacker can learn the identities of the key codes, by observing how they are read from the computer and from the software. Two, the hacker can learn how the security process 45 blocks running of the program, and defeat the blockage.

Figure 8A:
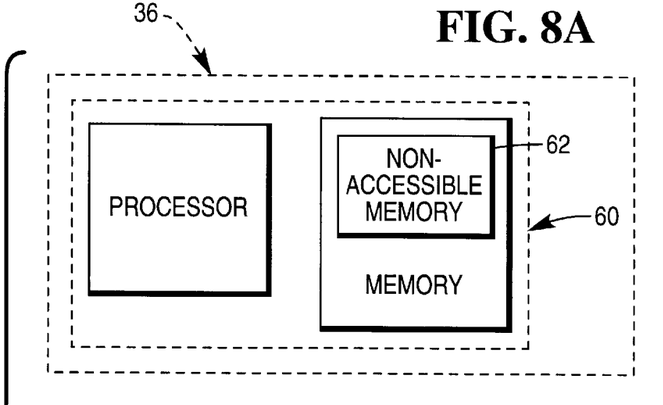
FIG. 8 illustrates three architectures for running the security process 45 of FIG. 7B.
Figure 8B:
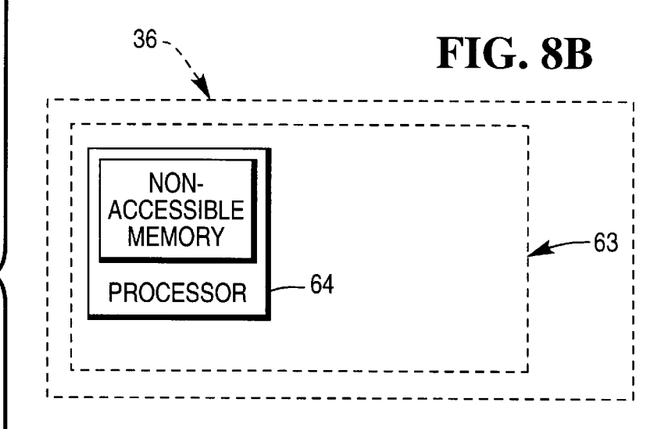
Figure 8C:
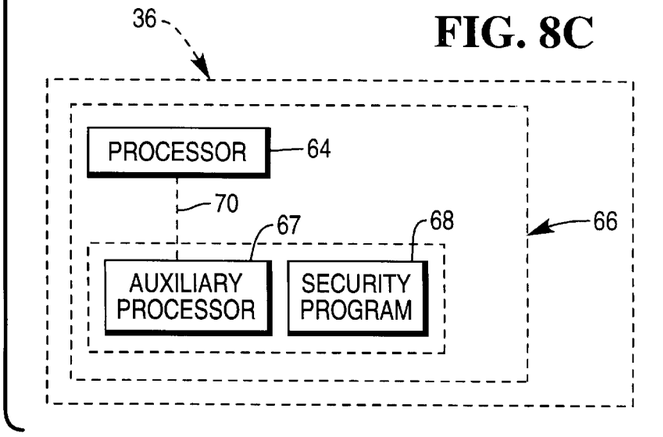

To prevent such hacking, the invention can be designed so that the security process 45 in FIG. 7B cannot be accessed by a de-bugger. FIG. 8 illustrates three designs, or architectures, which defeat access to the security process 45.

In architecture 60, the security process 45 is located within a region of memory 62 which is non-accessible to users. It is known in the art how to render regions of memory non-accessible to users. For example, in a client-server system, such as found in many universities, students, at various terminals, access a larger computer. However, the students are denied access to the operating system of the larger computer. The operating system handles the details of blocking access. Under architecture 60 in FIG. 8, a hacker is denied access to the security process 45.

In architecture 63, the security process is also made non-accessible, but by locating it within a section of memory which is, again, non-accessible, as by locating the security process 45 within a permanent cache, readable only by the processor 64.

In architecture 66, an auxiliary processor 67 is provided, which runs the security process 45 in FIG. 7B, every time a program launch is attempted. The security process 45 is accessible to the auxiliary processor 67, but not to the main processor 64. Since users can deal with the main processor 64, but not the auxiliary processor 67, they cannot access the security process 45.

When the auxiliary processor 67 determines that a match is found in the key codes, a signal is delivered on line, or bus, 70 to the processor 64, which may resemble an interrupt. This line is not available to a hacker, unless the hacker takes physical control of it, as by connecting a wire to line 70. Only when the processor 64 receives the signal on line 70 does the processor complete the launch sequence of FIG. 7B. Otherwise, the processor "kicks out," in block 60.

These three architectures (1) detect when a program launch is requested; then (2) run a security process 45, which compares the key code of the computer with that of the program to be run; then (3) allow launch, if the comparison meets predetermined criteria. Preferably, the security process 45 is located within memory which is not made available to users.

Significant Features

1. A significant feature of users' key codes is that they are not equivalent to the well-known "passwords" which are used to log into computer systems. One difference is that, unlike passwords, the key code is not entered by the user. Instead, the key code is retrieved from a memory location, perhaps by security process 21 in FIG. 1. The user is granted no access to this memory location. A second difference is that, as stated above, a user's key code is assigned by a system administrator.

2. A second significant feature is that the key codes contain fields, which contain sub-codes, which represent information, in encoded form, which is intelligible to humans. For example, the fields of FIG. 4 contain sub-codes, which are binary numbers. In the "Security Clearance Level" field, the sub-code "00" represents a "classified" security clearance. That sub-code indicates that the user holds a "classified" security clearance, which is information intelligible to a human.

In contrast, an ordinary password is a meaningless sequence of characters.

3. The key code of a resource, in effect, specifies (a) characteristics of users who are to be granted access to the resource and (b) conditions under which access is to be granted. The key code of a user specifies the characteristics of the user and other information.

The security process compares the two key codes, and may also resort to external information, in granting access. For example, a resource's key code may state that only persons having a surname beginning with "W" may gain access. In this connection, the security process would examine a user's key code to determine the user's surname.

However, this resource may also specify that access is to be granted only on odd-numbered Wednesdays. The security process would examine the corresponding field of the user's key code to determine whether the user is allowed access on odd-numbered Wednesdays, or at all times. But, in addition, the security process will also examine a calendar (which is information external to the key codes), to determine whether the day is actually an odd-numbered Wednesday.

Numerous substitutions and modifications can be undertaken without departing from the true spirit and scope of the invention. What is desired to be secured by Letters Patent is the invention as defined in the following claims.

We claim:

1. In a single computer which contains a processor and which runs software, the improvement comprising:

a) a first code, associated with the computer, which is burned into ROM of the computer, and which is readable by the processor;

b) a second code, associated with software, which is readable by the processor upon attempted launch of the software by the processor; and c) security process means for
      i) comparing the first and second codes, and
      ii) blocking the attempted launch by the processor if the codes fail to match in a predetermined manner.

* * * * *